US011443858B2

United States Patent

(12) United States Patent
Miao et al.

(10) Patent No.: US 11,443,858 B2
(45) Date of Patent: Sep. 13, 2022

(54) NEUTRON MODERATION MODULES

(71) Applicant: UCHICAGO ARGONNE, LLC, Chicago, IL (US)

(72) Inventors: Yinbin Miao, Naperville, IL (US); Nicolas E. Stauff, Oak Park, IL (US); Sumit Bhattacharya, Darien, IL (US); Abdellatif M. Yacout, Naperville, IL (US); Taek K. Kim, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 16/926,132

(22) Filed: Jul. 10, 2020

(65) Prior Publication Data

US 2022/0013243 A1 Jan. 13, 2022

(51) Int. Cl.

| | |
|---|---|
| ***G21C 5/12*** | (2006.01) |
| ***G21C 15/08*** | (2006.01) |
| ***G21D 5/02*** | (2006.01) |

(52) U.S. Cl.

CPC ............... *G21C 5/12* (2013.01); *G21C 15/08* (2013.01); *G21D 5/02* (2013.01)

(58) Field of Classification Search

CPC ............. G21C 5/12; G21C 5/02; G21C 15/08
USPC ......................... 376/350, 416, 417, 458, 904
See application file for complete search history.

(56) References Cited

U.S. PATENT DOCUMENTS

| | | | |
|---|---|---|---|
| 3,277,565 A | 10/1966 | Bohlander | |
| 3,342,692 A * | 9/1967 | Bourrasse | G21C 3/20 376/417 |
| 3,784,384 A | 1/1974 | Webb | |
| 4,071,587 A | 1/1978 | Eggers | |
| 8,652,589 B2 | 2/2014 | Ramm | |
| 2015/0063523 A1 | 3/2015 | Yacout et al. | |

FOREIGN PATENT DOCUMENTS

| | | |
|---|---|---|
| CN | 101265603 A | 9/2008 |
| CN | 101629028 A | 1/2010 |
| CN | 103557612 A | 2/2014 |

OTHER PUBLICATIONS

Anderson et al., Reactivity control of fast-spectrum reactors by reversible hydriding of yttrium zones, NASA TN D-4615 (1968).
Appel et al., Gamma Titanium Aluminide Alloys: Science and Technology, John Wiley & Sons (2011).
Bejaoui et al., ECRIX-H experiment: Synthesis of post-irradiation examinations and simulations, J. Nuclear Materials, 415(2):158-66 (2011).
Brimahll et al., Database on Permeation, Diffusion, and Concentration of Hydrogen Isotopes in Fusion Reactor Materials, Fusion Reactor Materials Semiannual Progress Report, DOE/ER-0313/16 (1994).
Chaffron et al., Innovative SiC/SiC Composite for Nuclear Applications, EPJ Web of Conferences (2013).

(Continued)

*Primary Examiner* — Jack W Keith
*Assistant Examiner* — Daniel Wasil
(74) *Attorney, Agent, or Firm* — Marshall, Gerstein & Borun LLP

(57) ABSTRACT

Provided herein is a neutron moderation module and a thermal-neutron nuclear micro-reactor.

19 Claims, 12 Drawing Sheets

(56) References Cited

OTHER PUBLICATIONS

Chai et al., Ultra-thin AI2-O3 films grown by atomic layer deposition for corrosion protection of copper, RSC Advances, 4(92):50503-9 (2014).
Comeli et al., Effects of tempering temperature on the microstructure and creep resistance of X22C4MoV12-1 steel used on steam turbine blades, Am J Materials Sci., 8(4):65-72 (2018).
Dever et al., Research on high-termperature aerospace materials at NASA Glenn Research Center, J. Aerospace Engineering, 26(2):500-514 (2013).
El-Genk et al., A review of refractory metal alloys and mechanically alloyed-ixude dispersion strengthened steels for space nuclear power systems, J Nuclear Materials, 340(1):93-112 (2005).
Elen et al., Voids in vanadium, niobium and molybdenum by fast neutron irradiation at high temperatures, J. Nuclear Materials, 39(2):194-202 (1971).
Forcey et al., Formation of hydrogen permeation barriers on steels by aluminising, J. Nuclear Materials, 182:36 (1991).
Forcey et al., Hydrogen transport and solubility in 316L and 1.4914 steels for fusion reactor applications, J. Nucleaer Materials, 160:117-24 (1988).
Gibala et al., Hydrogen embrittlement and stress corrosion cracking, ASM International, 324 (1984).
Hishinuma et al., Void swelling in electron irradiated Hastelloy-X. J. Nuclear Science and Technology, 15(4): 288-295 (1978).
Hollenberg et al., Tritium/hydrogen barrier development, Fusion Engineering and Design, 28:190-208 (1995).
Honeycombe et al., Steels: Microstructure and Properties. Metallurgy and Materials Science, American Society for Metals (Jan. 1982).
Horak et al., Creep properties of Nb-1Zr and Nb-1Zr-0.1 C, No. ORNL-6809, Oak Ridge National Laboratory (1994).
Investigation of the Environment Fate of Tritium in the Atmosphere, Canadian Nuclear Safety Commission (CNSC), INFO-0792 (2009).
James et al., 700 Bar type IV H2 pressure vessel cost projections. IN: Department of Energy Physical-Based Hydrogen Storage Workshop: Identifying Potential Pathways for Lower Cost 700 Bar Storage Vessels (2016).
Johnson et al., A brief review of atomic layer deposition: from fundamentals to applications, Materials Today, 16(5):236-46 (2014).
Katoh et al., Observation and possible mechanism of irradiation induced creep in ceramics, J. Nuclear Materials, 434(1-3):141-151 (2013).
Kellner, Space Age Ceramics Are Aviation's New Cup of Tea, General Electric Reports, downloaded from the Internet at: <https://www.ge.com/reports/space-age-cmcs-aviations-new-cup-of-tea/> (published Jul. 13, 2016).
Koyanagi et al., SiC/SiC Cladding Materials Properties Handbook, Technical Report ORNL/TM-2017/385, Oak Ridge National Laboratory (2017).
Leonard et al., Nb-base FS-85 alloy as a candidate structural material for space reactor applications: Effects of thermal aging, Metallurgical and Materials Transactions A, 40(4):838-55 (2009).
Lundin et al., Pressure-temperature-composition relationships of the yttrium-hydrogen system, J. Electrochemical Soc., 109(9):838-42 (1962).
Management of Tritium at Nuclear Facilities, IAEA Vienna, Technical Report Series No. 234, 1984.
Matejicek et al., Characterization of less common nitrides as potential permeation barriers, Fusion Engineering and Design, 139:74-80 (2019).
Merrigan, Heat Pipe Technology Issues, 1st Symposium on Space Nuclear Power Systems, Albuquerque, New Mexico, Jan. 11-13, 1984, Los Alamos National Laboratory LA-UR-84-1238 (1984).
Miao et al., Advanced moderation module for thermal neutron reactors operating at elevated temperatures, United States. doi:10.2172/1656612 (published Aug. 31, 2020).
Mueller et al. (eds.), Metal Hydrides, Elsevier 2013.
Muroga, Refractory metals as core materials for Generation IV nuclear reactors, In: Structural Materials for Generation IV Nuclear Reactors, pp. 415-440. Woodhead Publishing, 2017.
Olander et al., Uranium-zirconium hydride fuel properties, Nuclear Engineering and Design, 239(9):1406-24 (Aug. 2009).
Osborne et al., Reducing Irradiation Damage in a Long-Life Fast Reactor with Spectral Softening, Energies, 11(6):1507 (2018).
Perujo et al., Tritium permeation barriers for fusion technology, Fusion Engineering and Design, 28:252 (1995).
Prasad et al. (eds.), Aerospace Materials and Material Technologies, vol. 3, Singapore: Springer (2017).
Ribeiro et al., Hydrogen gas permeation through amorphous and partially crystallized Fe40Ni38Mo4B18, Mat. Res, vol. 15 No. 5 Aug. 30, 2012.
Sauder, Ceramic matrix composites: nuclear applications, Ceramic Matrix Composites: Materials, Modeling and Technology: pp. 609-646 (2014).
Senor et al., Thermophysical property correlations for the niobium-1% zirconium alloy, J. Nuclear Materials, 173(3):261-73 (1990).
Senor et al., Transport property correlations for the niobium-1% zirconium alloy, J. Nuclear Materials, 173(3):274-83 (1990).
Serra et al., Hydrogen permeation measurements on alumina, J. Am. Ceramic Soc., 88:15 (2005).
Shivprasad et al., High temperature moderator material for microreactors, No. LA-UR-20-21710, Los Alamos National Lab, United States (Feb. 25, 2020).
Simnad, The U-ZrHx alloy: its properties and use in TRIGA fuel, Nuclear Engineering and Design, 64(3):403-22 (1981).
Singh et al., Interlaboratory round robin study on axial tensile properties of SiC-SiC CMC tubular test specimens, Int. J. Applied Ceramic Technology, 15(6):1334-49 (2018).
Snead et al., Handbook of SiC properties for fuel performance modeling (thermal conductibility), J. Nuclear Materials, 371:329-77 (2007).
Snyder, Aircraft Nuclear Propulsion: An Annotated Bibliography, prepared for the United States Air Force History and Museums Program, May 3, 1996.
Song, Hydrogen permeation resistance of plasma-sprayed Al2O3 and Al2O3-13wt.% TiO2 ceramic coatings on austenitic stainless steel, Surface and Coatings Technology, 168:191 (2003).
Stone et al., Stress analysis and probabilistic assessment of multi-layer SiC-based accident tolerant nuclear fuel cladding, J. Nuclear Materials, 466:682-97 (2015).
Summary Report of HTRE No. 3 Nuclear Excursion, United States: N. p., 1965. Web. doi:10.2172/4643464.
Suzuoka, Lattice and Grain Boundary Diffusion in polycrystals, Transactions of the Japan Institute of Metals, 1961 vol. 2 Issue 1 pp. 25-32.
Tamura, Hydrogen Permeation Characteristics of TiN-Coated Stainless Steels, Journal of Materials Science and Engineering A, 5 (5-6) (2015) 204-208.
U.S. Appl. No. 16/925,781, "Hydrogren Permeation Barrier Coatings and Methods of Making the Same", filed Jul. 10, 2020.
Vetrano, Hydrides as neutron moderator and reflector materials, Nuclear Engineering and Design, 14(3):390-412 (1971).
Ward et al., Technical challenges and future direction for high-efficiency metal hydride thermal energy storage systems, Appl. Physics A, 122(4):462 (2016).
Yokoyama et al. Proceedings of the International Conference on Nuclear Engineering (ICONE-9), pp. 8-12 (2001).
Yvon (ed.), Structural Materials for Generation IV Nuclear Reactors, Woodhead Publishing (2016).
Zhu, Aerospace ceramic materials: thermal, environmental barrier coatings and SiC/SiC ceramic matrix composites for turbine engine applications, NASA/TM-2018-219884 (2018).

* cited by examiner

NEUTRON MODERATION MODULES

STATEMENT OF GOVERNMENT SUPPORT

This invention was made with government support under Contract No. DE-AC02-06CH11357 awarded by the United States Department of Energy to UChicago Argonne, LLC, operator of Argonne National Laboratory. The government has certain rights in the invention.

BACKGROUND

As a cost-competitive approach for the utilization of atomic energy, thermal neutron reactors account for the majority of existing nuclear reactors in the world. In a thermal neutron reactor, the fast neutrons produced by fission reactions must be efficiently moderated to become thermal neutrons before being adsorbed so as to initiate new fissions and thus to sustain the chain reactions. Materials consisting of high number density of light elements/isotopes with high neutron scattering cross sections and low neutron adsorption cross sections are ideal neutron moderators. Those elements/isotopes with excellent moderation performance usually include hydrogen (protium & deuterium) and carbon. Although hydrogen isotopes are the best in moderating neutrons, elemental hydrogen does not exist as a condensed matter under in-reactor conditions. Therefore, hydrogen is usually utilized as neutron moderator in the form of its condensed compounds such as water. In fact, light water and heavy water are the two most common moderator materials in current commercial nuclear power reactors (i.e. light water reactors and heavy water reactors).

However, as the efficiency of a heat engine is positively dependent on the temperature of its hot source, high-efficiency nuclear reactors are expected to operate at higher temperatures. Even under high pressure, it is challenging for water to maintain a condensed state at beyond 400° C. to have sufficient hydrogen density. At these elevated temperatures, graphite (elemental carbon), instead of water, has been selected to moderate neutrons in those reactor designs operating at high temperatures, such as molten salt reactors (MSRs) and very high temperature reactors (VHTRs). However, as hydrogen atoms are significantly more efficient in slowing down neutrons compared to carbon atoms, the adoption of graphite can tend to increase the required volume/mass of the moderation material and thus limit the compactness and mobility of the reactor. While the performance of conventional reactors is less sensitive to size/weight, the attractiveness of small modular reactors (SMRs) and micro-reactors, which are a focus of the contemporary nuclear industry, is highly dependent on their compactness and weight to enable mobility. In commercially viable high-temperature SMRs or micro-reactors, the compact core can be achieved by increasing the fuel fraction, which, as a trade-off, degrades the moderator-to-fuel ratio from its optimum. In order to design the reactor near the optimum moderator-to-fuel ratio, high-performance moderator capable of efficiently slowing down neutrons is required to compensate for the high fuel fraction. Hence, the nuclear SMR and micro-reactor industry has an immediate need for a high-performance moderation module that is capable of operating at elevated temperatures.

SUMMARY

In embodiments, a moderation module can include a metal hydride core; and a shell surrounding the core, the shell can include at least one $H_2$ permeation barrier coating; and at least one transition metal layer, wherein the at least one $H_2$ permeation barrier coating is disposed between the at least one transition metal layer and the core.

In embodiments, the shell of the moderation module can further include at least one diffusion barrier layer, wherein the at least one $H_2$ permeation barrier coating and the at least one diffusion barrier layer are separated by the at least one transition metal layer.

In embodiments, a thermal neutron reactor can include a composite matrix, wherein the composite matrix comprises the moderation module in accordance with embodiments disclosed herein, a fuel, a holding material, and a heat transfer module.

BRIEF DESCRIPTION OF FIGURES

FIG. 10 is a graph of the phase identification of various transition metal layers that are uncoated, coated with a single $H_2$ permeation barrier coating in accordance with embodiments disclosed herein, and coated with a multilayered $H_2$ permeation barrier coating in accordance with embodiments disclosed herein;

DETAILED DESCRIPTION

In accordance with embodiments, moderation modules can include a metal hydride core and a shell surrounding the core. The shell can include at least one $H_2$ permeation barrier coating and at least one transition metal layer, wherein the at least one $H_2$ permeation barrier coating is disposed between the at least one transition metal layer and the core. The shell can further include at least one diffusion barrier layer. One of the at least one diffusion barrier layers can be disposed such that the transition metal layer is interposed between the at least one diffusion barrier layer and the $H_2$ permeation barrier coating. The moderation module can also further include at least one ceramic matrix composite layer. In embodiments, the moderation module can include both at least one diffusion barrier layer and a least one ceramic matrix composite layer, with the at least one diffusion barrier layer being disposed between the at least one transition metal layer and the at least one ceramic matrix composite layer.

It has been advantageously found that the moderation modules provided herein have excellent hydrogen density at high temperature (e.g., 600° C. or more), can maintain the moderation modules integrity under thermal cycles/shocks and high irradiation. Thermal cycles/shocks can include, for example: (1) start/shutdown of the reactor from room temperature to operation temperature (e.g., 800° C. to 1000° C.), (2) transient conditions in the reactor, such as increasing the temperature from 800° C. to 1000° C. in a short time period; and high irradiation, such as fast flux typically around $10^{14}$ n/cm$^2$-s, fast fluence about $10^{23}$ n/cm$^2$, have excellent hydrogen barrier performance, and/or have high-temperature mechanical strength without introducing extraneous neutron penalty.

In embodiments, the moderation module can withstand temperatures of greater than 600° C. without substantial degradation. In embodiments, the moderation module can withstand temperatures of greater than 800° C. without substantial degradation. In embodiments, the moderation module can withstand temperatures of greater than 900° C. without substantial degradation. In embodiments, the moderation module can withstand temperatures of greater than 1000° C. without substantial degradation. As used herein, the term "substantial degradation" refers to either a loss of integrity, such as cracking or spalling of any portion of the moderation module or layer of the shell, or a loss of hydrogen such as through hydride decomposition and hydrogen gas escaping from the moderation module.

Figure 3:
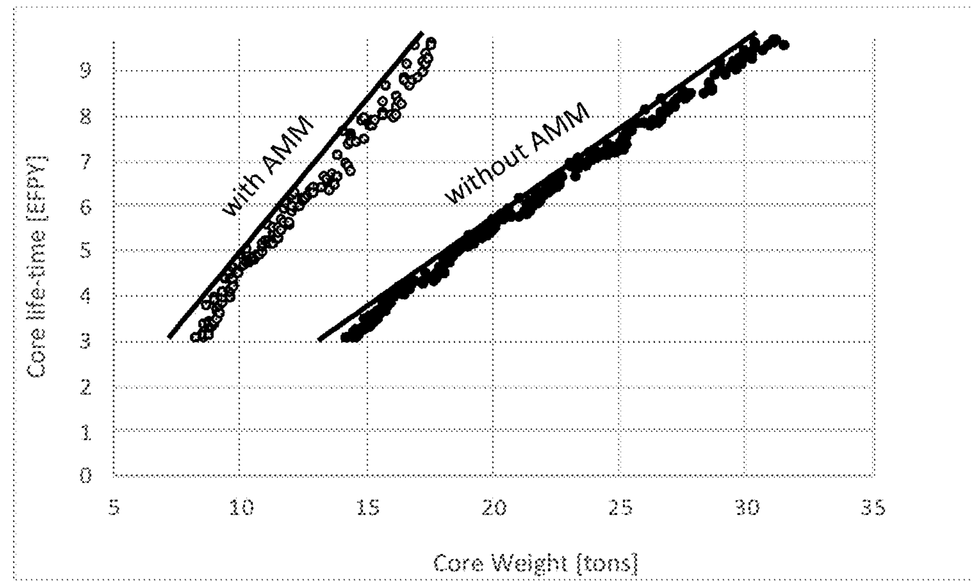
FIG. 3 is a graph showing pareto-frontiers displaying the best achievable core solutions with maximum core lifetime versus minimum core weight that can be obtained with a Very-High Temperature-type thermal neutron reactor with a moderation module in accordance with embodiments of the disclosure and a thermal neutron reactor without a moderation module.
Figure 4:
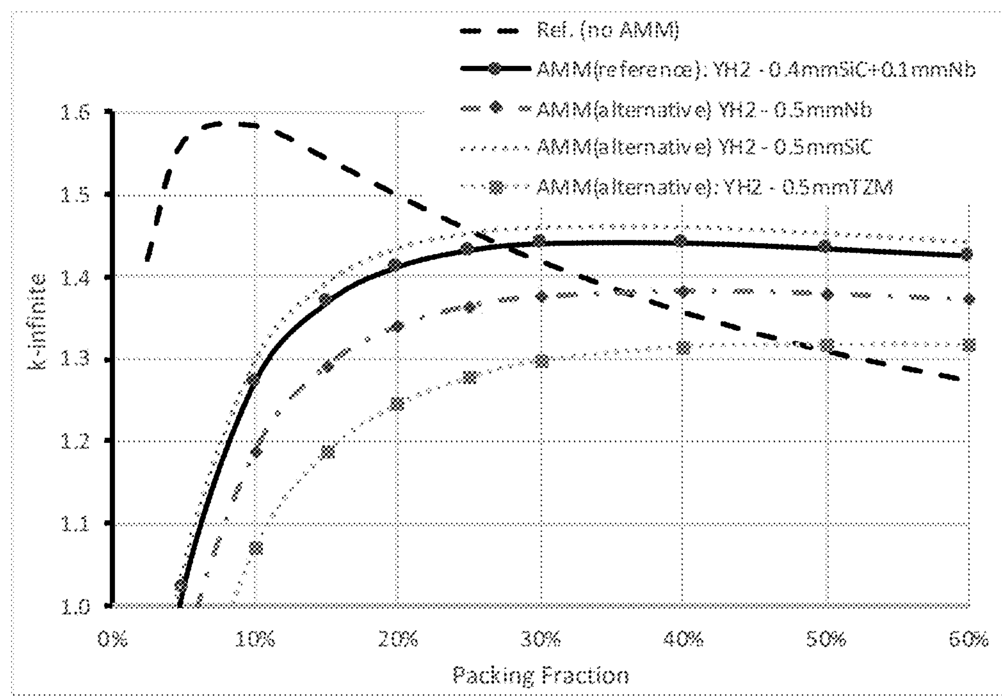
FIG. 4 is a graph showing the neutron multiplication factors (simply, k-infinity) of a TRISO-fueled, graphite-moderated assembly as a function of TRISO fuel packing fraction in a thermal neutron reactor without and with the MM in accordance with embodiments of the disclosure, replacing some graphite at the periphery of the assembly.
Figure 5:
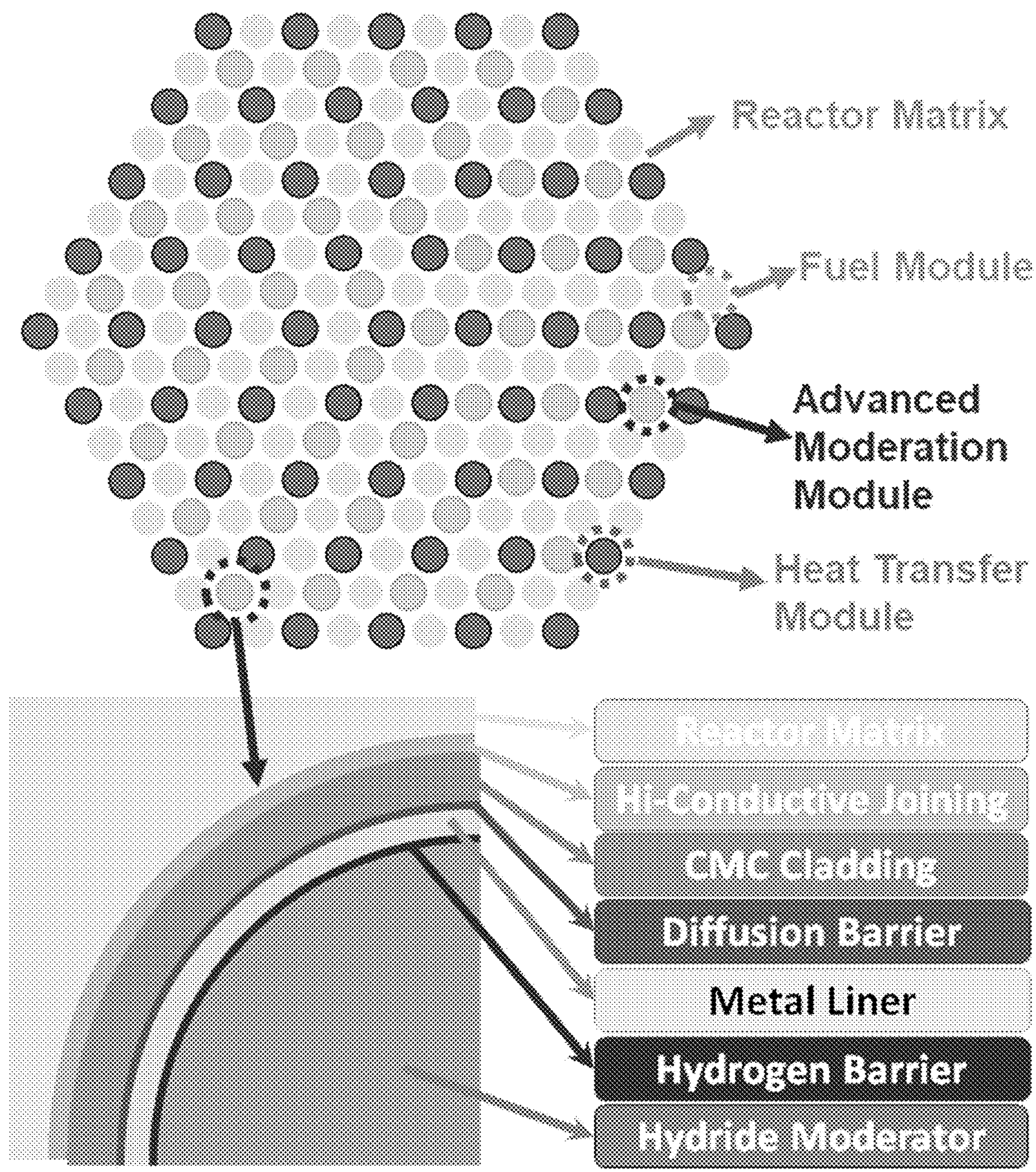
FIG. 5 is a schematic illustration of an example hexagonal block of a thermal neutron reactor in accordance with embodiments herein and shows a blow up of a schematic illustration of an example moderation module in accordance with embodiments herein.
Figure 6A:
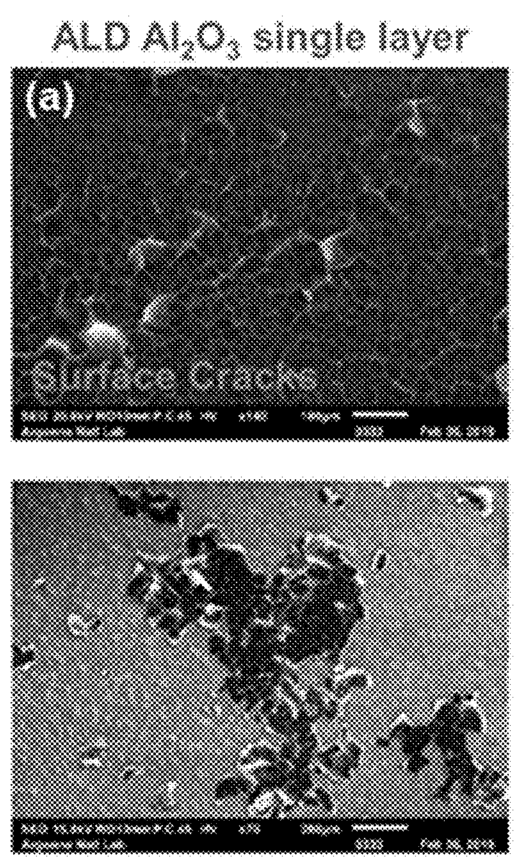
FIG. 6A are scanning electron microscopy (SEM) images of a $H_2$ permeation barrier single layer structure in accordance with embodiments of the disclosure after one heat cycle from room temperature to 950° C. in a 5% $H_2$/95% Ar atmosphere (top SEM image) and after four heat cycles from room temperature to 950° C. in a 5% $H_2$/95% Ar atmosphere (bottom SEM image)
Figure 6B:
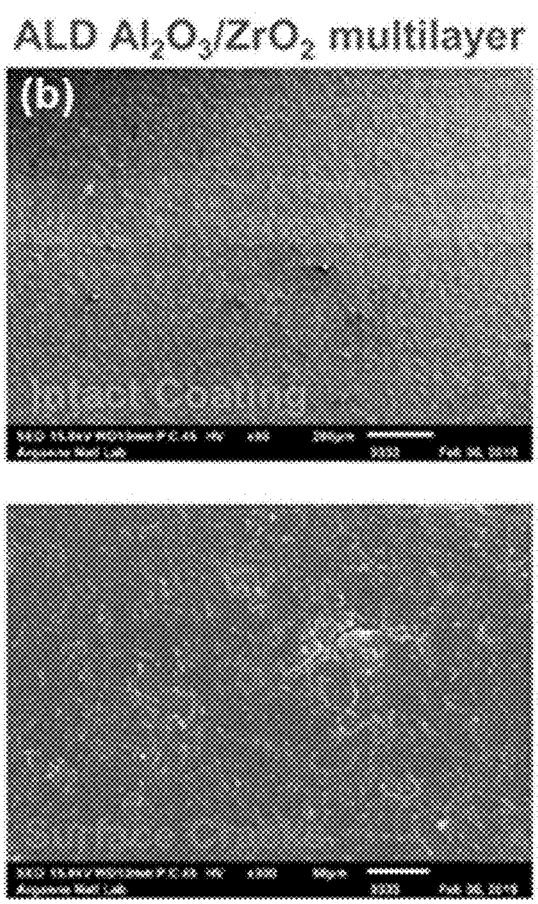
FIG. 6B are scanning electron microscopy (SEM) images of a $H_2$ permeation barrier multi-layer structure in accordance with embodiments of the disclosure after one heat cycle from room temperature to 950° C. in a 5% $H_2$/95% Ar atmosphere (top SEM image) and after four heat cycles from room temperature to 950° C. in a 5% $H_2$/95% Ar atmosphere (bottom SEM image)
Figure 6C:
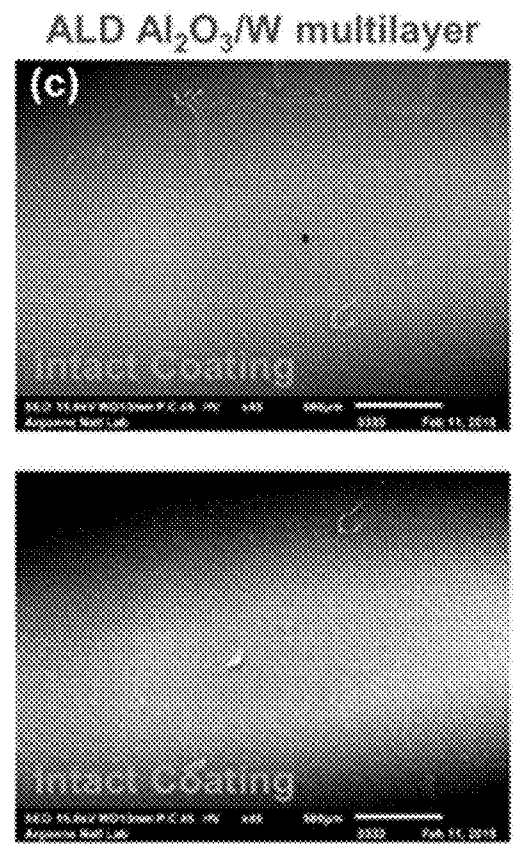
FIG. 6C are scanning electron microscopy (SEM) images of a $H_2$ permeation barrier multi-layer structure in accordance with embodiments of the disclosure after one heat cycle from room temperature to 950° C. in a 5% $H_2$/95% Ar atmosphere (top SEM image) and after four heat cycles from room temperature to 950° C. in a 5% $H_2$/95% Ar atmosphere (bottom SEM image)

In accordance with embodiments, a thermal neutron reactor is provided. The thermal neutron reactor can include a composite matrix, wherein the composite matrix comprises the moderation module of the disclosure, a fuel, a holding material, and a heat transfer module. It has been advantageously found that the moderation module provided in the disclosure can reduce the total weight of the thermal neutron reactor by at least about 10 wt %, or at least about 20 wt %, or at least about 30 wt %, based on the total weight of the thermal neutron reactor, as well as providing suitable or even improved neutron moderation (FIG. 3). For example, FIG. 3 shows a graph of the best achievable core solutions with maximum core lifetime versus minimum core weight that can be obtained with a Very-High Temperature thermal neutron reactor with a moderation module in accordance with embodiments of the disclosure and a thermal neutron reactor without a moderation module as a comparative example (Nicolas E. Stauff, C. H. Lee, A. Wells, C. Filippone, "Design Optimization of the Holos-Quad Micro-Reactor Concept," proceedings of PHYSOR, Mar. 29-Apr. 2, 2020). For example, the moderation modules provided herein can withstand temperatures of greater than 1000° C. without substantial degradation, the moderation modules can provide a sufficient hydrogen density ($N_H$), such as about $5.3\times10^{22}$ atoms/cm$^3$, the moderation modules can provide excellent cladding strength and cladding neutronics, and the moderation modules can provide excellent barrier to reduce $H_2$ permeability. Referring to FIG. 5, in embodiments, the moderation modules can be advantageously designed to be placed within a graphite matrix. The moderation module can also be designed to be placed in other matrices, such as SiC, BeO, MgO, steel, and the like. This can reduce the required composite matrix material (e.g., graphite) amount. Referring to FIG. 4, the moderation modules in accordance with embodiments of the disclosure (moderation module with SiC/Nb) can allow for optimum moderation (maximum of the curve) with high fuel density (for TRISO fuel, packing fraction larger than 30%) and higher k-infinity in this packing fraction range than comparative examples shown without the moderation module of the disclosure.

Metal Hydride Core

In any of the embodiments herein, the metal hydride core can include a compound represented by the formula $AR_x$, wherein A is one or more of Zr, Y, Ti, Li, Ca, Sc, or combinations thereof; each R is independently H or D; and x is in a range of 0.1 to 10.

In embodiments, each R is H. In embodiments, each R is D.

In embodiments, x can be 0.1 or more. In embodiments, x is in a range of about 0.1 to about 9, about 0.5 to about 10, about 0.5 to about 5, about 1 to about 8, about 1 to about 7, about 1 to about 5, about 1 to about 4, about 2 to about 5, or about 2 to about 4. For example, x can be about 0.1, 0.5, 0.75, 1, 2, 3, 4, 5, 6, 7, 8, 9, or 10.

In embodiments, the metal hydride core can include $YR_2$ or $YR_3$, wherein Y is yttrium and each R independently is H or D. In embodiments, metal hydride core includes $YH_2$.

The metal hydride core can further include a dopant. In embodiments, the dopant can include one or more of Cr, Ce, Pr, Nd, Pm, Sm, Eu, Gd, Tb, Dy, Ho, Er, Tm, Yb, and Lu.

The metal hydride core can have a hydrogen density ($N_H$) of about $5\times10^{22}$ atoms/cm$^3$ to about $1\times10^{23}$ atoms/cm$^3$, about $5.25\times10^{22}$ atoms/cm$^3$ to about $1\times10^{23}$ atoms/cm$^3$, or about $5.5\times10^{22}$ atoms/cm$^3$ to about $1\times10^{23}$ atoms/cm$^3$. For example, the metal hydride core can have a $N_H$ ($\times10^{22}$ atoms/cm$^3$) of about 5, 5.1, 5.2, 5.3, 5.4, 5.5, 5.6, 5.8, 6, 6.5, 7, 7.5, 8, 8.5, 9, 9.5, or 10. As used herein, the hydrogen density ($N_H$) is determined using the as-fabricated conditions and can be subject to change during operation.

Figure 2:
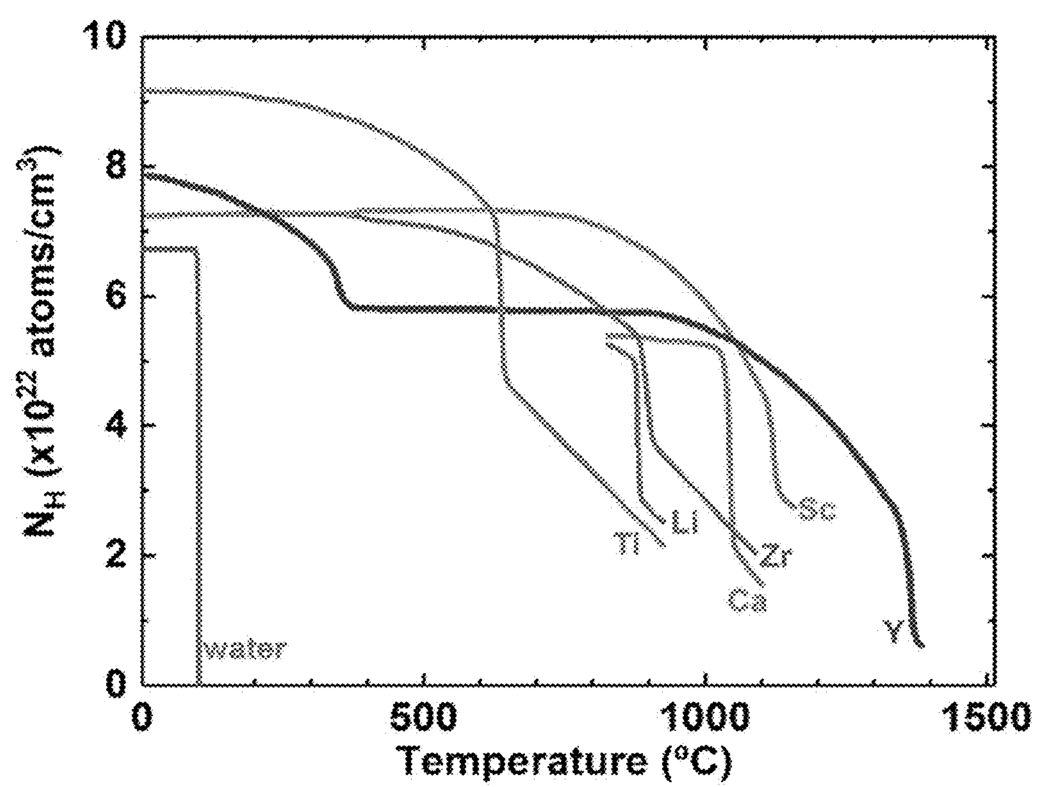
FIG. 2 is a graph showing $N_H$ as a function of temperature for high-performance metal hydride/deuteride cores in accordance with embodiments of the disclosure.

It is advantageously provided herein that the metal hydride core, such as, $YH_2$, has excellent hydrogen density (i.e., about $5\times10^{22}$ atoms/cm$^3$ or more) at high temperature (e.g., 1000° C. or more) for uses such as, to benefit neutronics, as shown in FIG. 2. FIG. 2 is a graph of the hydrogen density vs. temperature of various metal hydrides, including Ti, Li, Ca, Zr, Sc, and Y. The graph shows that $YH_2$ has excellent hydrogen density at high temperatures compared to other metal hydrides. As the temperature rises, most metal hydride cores lose the ability to maintain high hydrogen density, but it is advantageously provided that the metal hydrides cores herein maintain high hydrogen density even at temperatures above 1000° C., and therefore have high moderation performance.

$H_2$ Permeation Barrier Coating

In any of the embodiments herein, the $H_2$ permeation barrier coating can include one or more of oxides, nitrides, carbides, aluminides, silicides, elemental ceramics, and complex oxides. In embodiments, the $H_2$ permeation barrier coating can include one or more of $Al_2O_3$, $Y_2O_3$, $ZrO_2$, $TiO_2$, $SiO_2$, $Cr_2O_3$, ZrN, TiN, AlN, ZrC, TiC, SiC, NbC, FeAl, $FeAl_2$, $Fe_2Al_5$, $ZrAl_3$, $MoSi_2$, $NbSi_2$, Si, ($ZrO_2.SiO_2$), and ($ZrO_2.xY_2O_3$). In embodiments, the $H_2$ permeation barrier coating can include one or more of $Al_2O_3$, $ZrO_2$, and ZrN.

In embodiments, the $H_2$ permeation barrier coating can be provided as a multi-layer structure. In embodiments, a multi-layer $H_2$ permeation barrier coating structure can include alternating ceramic layers and metal layers. In embodiments, the ceramic layers can include one or more of oxides, nitrides, carbides, aluminides, silicides, elemental ceramics, and complex oxides. In embodiments, the ceramic layers can include one or more of $Al_2O_3$, $Y_2O_3$, $ZrO_2$, $TiO_2$, $SiO_2$, $Cr_2O_3$, ZrN, TiN, AlN, ZrC, TiC, SiC, NbC, FeAl, $FeAl_2$, $Fe_2Al_5$, $ZrAl_3$, $MoSi_2$, $NbSi_2$, Si, ($ZrO_2.SiO_2$), and ($ZrO_2.xY_2O_3$). In embodiments, the ceramic layers can include one or more of $Al_2O_3$, $ZrO_2$, and ZrN. In embodiments, the ceramic layers include or are $Al_2O_3$. In embodiments, the metal layers include one or more of refractory metals, high-temperature metals, high-temperature metal alloys, and intermetallic compounds. As used herein, the term "high-temperature metals" refers to metals that can resist high heat (e.g., 600° C. or more). As used herein, the term "high-temperature metal alloys" refers to a mixture of metals that can resist high heat and corrosion more effectively than standard carbon steel. The high-temperature metals and/or high-temperature metal alloys can include one or more of stainless steel, chromium, nickel, iron, copper, cobalt, molybdenum, tungsten, and titanium. The refractory metals can include one or more of Nb, Mo, Ta, W, Re, Ti, Co, Cr, Mn, Zr, Tc, Ru, Rh, Hf, Os, and Ir. In embodiments, the refractory metals can include Nb, Mo, Ta, W, and Re. In embodiments, the metal layers can include one or more of Mo, W, Nb, Ta, Ni, Co, Fe, Ru, Pd, and alloys thereof.

Each metal layer and each ceramics layer, independently, can have a thickness on the nanoscale. In embodiments, each metal layer and each ceramics layer, independently, can have a thickness about 0.1 nm to about 1000 nm. For example, each metal layer and each ceramic layer, independently, can have a thickness of about 5 nm to about 100 nm or about 5 nm to about 50 nm. In embodiments, each metal layer can have a thickness of about 25 nm to about 75 nm and each ceramic layer can have a thickness of about 5 nm to about 25 nm. For example, each metal layer can have a thickness of about 50 nm and each ceramic layer can have a thickness of about 15 nm. Each ceramic layer can have the same or different thicknesses. Each metal layer can have the same or different thicknesses. Further, various or all of the ceramic and metal layers can have the same or different thicknesses.

In embodiments, the $H_2$ permeation barrier multi-layer structure can have about 4 to 100 metal layers and ceramic layers total. For example, the $H_2$ permeation barrier multi-layer structure can have about 4 to about 45, about 4 to about 40, about 4 to about 30, about 4 to about 20, or about 10 to about 50, about 10 to about 40, about 10 to about 30, or about 20 to about 40, metal layers and ceramic layers combined. In embodiments, the $H_2$ permeation barrier multi-layer structure can have about 12 to about 18 metal layers, and about 12 to 18 ceramic layers.

In embodiments, the $H_2$ permeation barrier coating whether provided as a single layer or multi-layer structure, can have a total thickness of about 300 nm to about 5 μm, or about 400 nm to about 3 μm, or about 500 nm to about 2 μm, or about 750 nm to about 1.5 μm. For example, the $H_2$ permeation barrier coating can have a total thickness of about 300 nm, 400 nm, 500 nm, 600 nm, 700 nm, 750 nm, 800 nm, 900 nm, 950 nm, 1000 nm (1 μm), 1.25 μm, 1.5 μm, 2 μm, 3 μm, 4 μm, or 5 μm. In embodiments, the $H_2$ permeation barrier coating has a total thickness of about 1 μm.

In embodiments, the $H_2$ permeation barrier coating can be monolithic and substantially pinhole free. Surfaces that are "substantially pinhole free" can have less than 1% pinholes after deposition, or less than 0.1% pinholes, or less than 0.001% pinholes after deposition. Measurements for pinhole density can be found in Chai, Zhimin, Yuhong Liu, Jing Li, Xinchun Lu, and Dannong He. "Ultra-thin $Al_2O_3$ films grown by atomic layer deposition for corrosion protection of copper." *RSC Advances* 4, no. 92 (2014): 50503-50509.

In embodiments, the shell can include multiple $H_2$ permeation barrier coatings, such as 2, 3, 4, or 5 $H_2$ permeation barrier coatings in the shell. The moderation module having multiple $H_2$ permeation barrier coatings is different from the $H_2$ permeation barrier multi-layer structure, as there may be 2 or more For example, a $H_2$ permeation barrier coating with a multi-layer structure can be deposited onto the transition metal layer and another $H_2$ permeation barrier coating with a multi-layer structure can be deposited on the ceramic matrix composite layer. For example, a $H_2$ permeation barrier coating with a multi-layer structure can be deposited on an inner surface of the transition metal layer and another $H_2$ permeation barrier coating with a single-layer structure can be deposited on an outer surface of the transition metal layer.

The $H_2$ permeation barrier coating can be deposited on the core and/or one or more of the shell layers via atomic layer deposition, physical vapor deposition, chemical vapor deposition, or other such surface chemical process, as well as by combinations of such surface chemical processes. In embodiments, the $H_2$ permeation barrier coating is deposited on the core and/or one or more of the shell layers via atomic layer deposition or chemical vapor deposition.

In embodiments, the $H_2$ permeation barrier coating is deposited on an inner surface of the transition metal layer. In embodiments in which the $H_2$ permeation barrier coating is provided on an inner surface of the transition metal layer, the $H_2$ permeation barrier prevents $H_2$ permeation to the transition metal layer and thereby prevents reaction of the transition metal layer with hydrogen to form undesired metal hydrides.

It has been found that the microstructure of the $H_2$ permeation barrier coating can affect the hydrogen permeability, particularly at high temperatures. Without intending to be bound by theory, it is believed that the $H_2$ permeability of the moderation module can be affected by: (a) grain size (e.g., coarse, ultra-sized, or nano-sized), (b) grain shape (e.g., dendritic, columnar, or equiaxed), and (c) crystalline or amorphous microstructure (e.g., polycrystalline or ultra-nanocrystalline).

The grain size of the $H_2$ permeation barrier coatings has been observed to indirectly affect the permeation of $H_2$. Larger grains generally show higher $H_2$ diffusion compared to smaller grains (Tamura, Motonori. "Hydrogen Permeation of Multi-Layered-Coatings." In *Advanced Materials Research*, vol. 1152, pp. 9-18. Trans Tech Publications, 2019). When the microstructure of the $H_2$ permeation barrier coating is fine-grained, high density of dislocations and numerous grain boundaries provide longer travel of atomic hydrogen through a crystal lattice. Therefore, it is believed that a $H_2$ permeation barrier coating having a microstructure with ultra- or nano-sized grains can improve high temperature performance. Nano-sized grains generally have a grain size of about 0.1 nm to about 100 nm, and ultra-sized grains have a grain size of about 100 nm to about 500 nm.

In embodiments, the $H_2$ permeation barrier coating can have equiaxed grains. $H_2$ permeation barrier coatings with dendritic and columnar grains generally have grain boundaries which originate near the substrate and extend toward the outer surface. This long and continuous grain boundary often provides an easy path (e.g., short circuit) or shorter travel time for the $H_2$ atoms to diffuse. In the case of equiaxed grains, the boundaries are more complex and present a tortuous path for the $H_2$ atoms to diffuse which forces the $H_2$ movement to slow down and often be trapped, resulting in superior $H_2$ impermeability performance (i.e., less $H_2$ permeability).

In embodiments, the $H_2$ permeation barrier coating can have a crystalline microstructure with nano-sized and/or ultra-size grains. In embodiments having a multi-layer structure, one or more of the layers can have a crystalline structure with nano-sized and/or ultra-sized grains In general, $H_2$ permeation barrier coatings with amorphous microstructures exhibit a large number of sites for hydrogen absorption, but many of these sites have high occupancy energy, and therefore, the hydrogen diffusivity in these materials is lower than the corresponding crystalline materials. Amorphous materials can perform well at lower temperature ranges, but at higher temperature, formation of hydrides can occur in conjunction with the possibility of crystalline transformations. This makes the use of entirely amorphous materials at high temperature ranges detrimental to the performance of the $H_2$ permeation barrier coating. Crystalline structures with nano-sized and/or ultra-sized grains typically have a lower permeability towards $H_2$ gas compared to a larger polycrystalline material.

In embodiments, a $H_2$ permeation barrier coating with a multi-layer structure can include both amorphous microstructures and ultra-nanocrystalline microstructures. For example, the $H_2$ permeation barrier coating with a multilayer structure can comprise a ceramic layer with an amorphous microstructure and a metal layer with an ultra-nanocrystalline microstructure. Other combinations of microstructures among the layers are also contemplated herein. For example, the multilayer structure can have any one or more of layers with amorphous microstructures, nanocrystalline microstructure with equiaxed grains, ultra-crystalline microstructures with equiaxed grains, nanocrystalline microstructures without equiaxed grains, ultracrystalline microstructures without equiaxed grains, and crystalline structures with larger than ultra-sized grains with equiaxed grains.

$H_2$ permeation barrier coating deposition methods that can deliver the desired microstructure and grain orientations include atomic layer deposition and chemical vapor deposition. Other deposition methods can be used, particularly, where control over microstructure may not be as critical. Methods such as physical vapor deposition, electrochemical deposition, and sputtering often lead to large polycrystalline and dendritic grain growths.

Additional examples of suitable $H_2$ permeation barrier coatings that can be used in embodiments of the moderation module of the disclosure can be found in U.S. application Ser. No. 16/925,781, entitled, "Hydrogen Permeation Barrier Coatings and Methods of Making the Same," filed Jul. 10, 2020, the disclosure of which is incorporated herein by reference.

Diffusion Barrier Layer

In any of the embodiments herein, the diffusion barrier layer can include one or more of oxides, nitrides, carbides, aluminides, silicides, elemental ceramics, and complex oxides. In embodiments, the diffusion barrier layer can include one or more of $Al_2O_3$, $Y_2O_3$, $ZrO_2$, $TiO_2$, $SiO_2$, $Cr_2O_3$, ZrN, TiN, AlN, ZrC, TiC, SiC, NbC, FeAl, $FeAl_2$, $Fe_2Al_5$, $ZrAl_3$, $MoSi_2$, $NbSi_2$, Si, ($ZrO_2.SiO_2$), and ($ZrO_2.xY_2O_3$). In embodiments, the diffusion barrier layer can include one or more of $Al_2O_3$, $ZrO_2$, and ZrN.

In embodiments, the diffusion barrier layer can be provided as a multi-layer structure. In embodiments, a multi-layer diffusion barrier layer can include alternating ceramic layers and metal layers. In embodiments, the ceramic layers can include one or more of oxides, nitrides, carbides, aluminides, silicides, elemental ceramics, and complex oxides. In embodiments, the ceramic layers can include one or more of $Al_2O_3$, $Y_2O_3$, $ZrO_2$, $TiO_2$, $SiO_2$, $Cr_2O_3$, ZrN, TiN, AlN, ZrC, TiC, SiC, NbC, FeAl, $FeAl_2$, $Fe_2Al_5$, $ZrAl_3$, $MoSi_2$, $NbSi_2$, Si, ($ZrO_2.SiO_2$), and ($ZrO_2.xY_2O_3$). In embodiments, the ceramic layers can include one or more of $Al_2O_3$, $ZrO_2$, and ZrN. In embodiments, the ceramic layers include or are $Al_2O_3$. In embodiments, the metal layers include one or more of refractory metals, high-temperature metals, high-temperature metal alloys, and intermetallic compounds. In embodiments, the metal layers can include one or more of Mo, W, Nb, Ta, Ni, Co, Fe, Ru, Pd, and alloys thereof.

Each metal layer and each ceramics layer, independently, can have a thickness on the nanoscale. In embodiments, each metal layer and each ceramics layer, independently, can have a thickness about 0.1 nm to about 1000 nm. For example, each metal layer and each ceramic layer, independently, can have a thickness of about 5 nm to about 100 nm or about 5 nm to about 50 nm. In embodiments, each metal layer can have a thickness of about 25 nm to about 75 nm and each ceramic layer can have a thickness of about 5 nm to about 25 nm. For example, each metal layer can have a thickness of about 50 nm and each ceramic layer can have a thickness of about 15 nm. Each ceramic layer can have the same or different thicknesses. Each metal layer can have the same or different thicknesses. Further, various or all of the ceramics and metal layers can have the same or different thicknesses.

In embodiments, the diffusion barrier multi-layer structure can have about 4 to 100 metal layers and ceramic layers total. For example, the diffusion barrier multi-layer structure can have about 4 to about 50, about 4 to about 45, about 4 to about 40, about 4 to about 30, about 4 to about 20, or about 10 to about 50, about 10 to about 40, about 10 to about 30, or about 20 to about 40, metal layers and ceramic layers combined. In embodiments, the diffusion barrier multi-layer structure can have about 12 to about 18 metal layers, and about 12 to 18 ceramic layers.

In embodiments, the diffusion barrier layer whether provided as a single layer or multi-layer structure, can have a total thickness of about 300 nm to about 5 μm, or about 400 nm to about 3 μm, or about 500 nm to about 2 μm, or about 750 nm to about 1.5 μm. For example, the diffusion barrier layer has a total thickness of about 300 nm, 400 nm, 500 nm, 600 nm, 700 nm, 750 nm, 800 nm, 900 nm, 950 nm, 1000 nm (1 μm), 1.25 μm, 1.5 μm, 2 μm, 3 μm, 4 μm, or 5 μm. In embodiments, the diffusion barrier layer has a total thickness of about 1 μm.

In embodiments, the diffusion barrier layer can be monolithic and substantially pinhole free.

In embodiments, the shell can include multiple diffusion barrier layers, such as 2, 3, 4, or 5 diffusion barrier layers in the shell, each of the diffusion barrier layers can have a single-layer structure or a multi-layer structure. The moderation module having multiple diffusion barrier layers is different from the diffusion barrier multi-layer structure, as there may be 2 or more For example, a diffusion barrier layer with a multi-layer structure can be deposited on to the transition metal layer and a diffusion barrier layer with a multi-layer structure can be deposited on the ceramic matrix composite layer. For example, a diffusion barrier layer with a multi-layer structure can be deposited on an inner surface of the transition metal layer and a diffusion barrier layer with a single-layer structure can be deposited on an outer surface of the transition metal layer.

The one or more diffusion barrier layer can be deposited on the core and/or one or more of the shell layers via atomic layer deposition, physical vapor deposition, chemical vapor deposition, or a surface chemical process. In embodiments, the diffusion barrier layer can be deposited on the core and/or one or more of the shell layers via atomic layer deposition or chemical vapor deposition. In embodiments, the diffusion barrier layer is deposited in between the transition metal layer and the ceramic matrix composite layer, and the diffusion barrier layer is separated from the $H_2$ permeation barrier coating by at least one of the transition metal layer and the ceramic matrix composite layer. In embodiments, the diffusion barrier layer can be deposited on an inner surface of the transition metal layer or an outer surface of the transition metal layer. For example, in embodiments, if a diffusion barrier layer is deposited on an inner surface of the transition metal layer, than the $H_2$ permeation barrier coating is deposited on an outer surface of the transition metal layer.

In general, the diffusion barrier layer can act as secondary protection to help stop $H_2$ permeation. In such embodiments, the diffusion barrier layer can be provided with the microstructures described above for the $H_2$ permeation barrier coating. Any of the microstructures disclosed above can be applied to the diffusion barrier layer whether provided as a single layer structure or a multi-layer structure. Various methods can be used for deposition of the diffusion barrier layer. In embodiments in which control of microstructure is desired, deposition methods such as atomic layer deposition or chemical vapor deposition can be used. Methods such as physical vapor deposition, electrochemical deposition, and sputtering can be used for diffusion barrier layers were nanocrystalline/ultracrystalline and/or equiaxed grain microstructures are not needed.

It is advantageously provided herein that the diffusion barrier layer can prevent undesired reactivity between shell layers, as well as acting as secondary protection to stop $H_2$ permeation. Further it is advantageously provided herein when the diffusion barrier is provided between the transition metal layer and the ceramic matrix composite layer, diffusion barrier can prevent undesired reactions between the transition metal layer and the ceramic matrix composite layer at high temperatures (i.e., 700° C. or more), as well as acting as secondary protection to stop $H_2$ permeation.

Transition Metal Layer

The transition metal layer can include one or more refractory metals. In embodiments, the transition metal layer includes one or more of Ce, Yb, Mo, W, Nb, Ta, Ni, Co, and Fe, and alloys thereof. In embodiments, the transition metal layer includes Nb, Mo, or both.

The transition metal layer can have a thickness of about 0.1 mm to about 2 mm. In embodiments, the transition metal layer can have a thickness of about 0.1 mm to about 1 mm, or about 0.2 mm to about 1 mm, or about 0.5 mm to about 1 mm. For example, the transition metal layer can have a thickness of about 0.1 mm, about 0.2 mm, about 0.3 mm, about 0.4 mm, about 0.5 mm, about 0.6 mm, about 0.7 mm, about 0.8 mm, about 0.9 mm, or about 1 mm. In embodiments in which portability is of interest, the transition metal layer can be provided as a thin layer (i.e., 0.1 mm to 1 mm), such that the overall weight of the moderation module is kept low.

In embodiments, the transition metal layer can be coated with a $H_2$ permeation barrier coating as described herein, a diffusion barrier layer as described herein, or both, wherein the $H_2$ permeation barrier coating is on an inner surface of the transition metal layer and the diffusion barrier layer is on an outer surface of the transition metal layer, or vice versa. In embodiments, the transition metal layer surrounds the core with an $H_2$ permeation barrier coating disposed between the transition metal layer and the core. In embodiments, an inner surface of the transition metal layer can be coated with the $H_2$ permeation barrier coating. In embodiments, an outer surface of the transition metal layer can be coated with the diffusion barrier layer. In embodiments, an inner surface of the transition metal layer can be coated with the $H_2$ permeation barrier coating, and an outer surface of the transition metal layer can be coated with the diffusion barrier layer.

Figure 8:
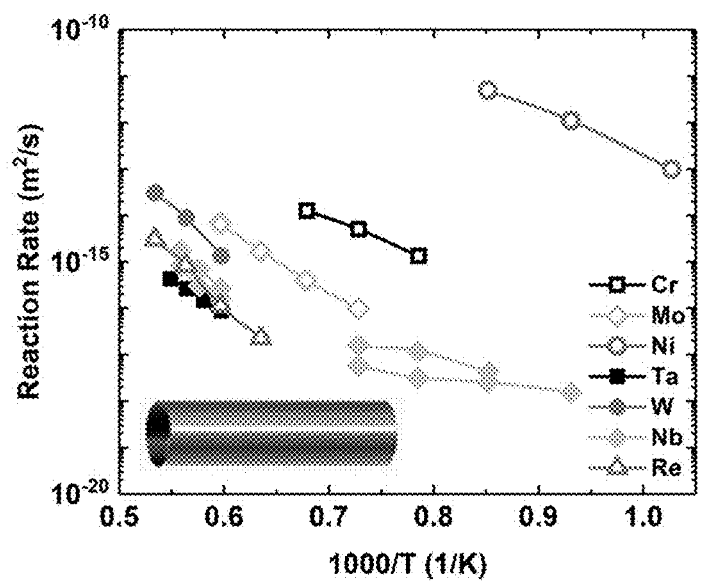
FIG. 8 is a graph showing the reaction rate of various transition metal layers of the disclosure as a function of the inverse of temperature.

It is advantageously provided herein that the transition metal layer can provide a ductile and radiation tolerant barrier, and can be further coated, such as, by atomic layer deposition. In embodiments, the transition metal layer can advantageously provide a low reactivity rate (e.g., $10^{-17}$ $m^2/S$ or less) with the ceramic matrix composite layer at high temperatures (e.g., 600° C. or more), such as, when the transition metal layer is Nb and the ceramic matrix composite layer is SiC/SiC (FIG. 8).

In embodiments, the transition metal layer is coated with a multi-layered $H_2$ permeation barrier coating, and the transition metal layer advantageously does not react to form a hydride or oxide during or following a heat cycle from room temperature to 950° C. in a 5% $H_2$/95% Ar atmosphere. In embodiments, the transition metal layer is coated with a multi-layered $H_2$ permeation barrier coating, and the transition metal layer advantageously does not react to form a hydride or oxide during or following four or more heat cycles from room temperature to 950° C. in a 5% $H_2$/95% Ar atmosphere.

Ceramic Matrix Composite Layer

In embodiments, the ceramic matrix composite layer is present in the moderation module. The ceramic matrix composite layer can include a reinforcement phase (A) and a matrix phase (B). In embodiments, the reinforcement phase can include ceramic fibers, particles, rods, powders, and the like. In embodiments, the reinforcement phase can include ceramic fibers and the matrix phase can include a ceramic matrix, wherein the notation is as follows: type of reinforcement phase/type of matrix (e.g., C/SiC is carbon fiber reinforced silicon carbide). In embodiments, the ceramic matrix composite layer can include ceramic fibers embedded in the ceramic matrix. In embodiments, the ceramic matrix composite layer includes one or more of SiC, C, $Al_2O_3$, $Al_2O_3$—$SiO_2$, $Si_3N_4$, SiC/SiC, C/SiC, C/C, SiC/C, and $Al_2O_3$/$Al_2O_3$. In embodiments, the ceramic composite matrix layer includes SiC/SiC. In embodiments, the reinforcement phase can include one or more of SiC, C, $Al_2O_3$, $Al_2O_3$—$SiO_2$, and $Si_3N_4$. In embodiments, the matrix phase can include one or more of SiC, C, $Al_2O_3$, $Al_2O_3$—$SiO_2$, and $Si_3N_4$. In embodiments, the reinforcement phase further comprises an interface coating comprising C, PyC, BN, SIC, $Al_2O_3$, $SiO_2$, $ZrO_2$, AlN, $LaPO_4$, $ErTaO_4$, $MeWO_4$, $MeMoO_4$, $ReTaO_4$, $Re_3NbO_4$, $MgWo_4$, $CaWo_4$, and the like. The interface coating can be any suitable coating known to one of ordinary skill in the art to prevent fusion of the matrix and the reinforcement phases.

The ceramic matrix composite layer can have a thickness of about 0.1 mm to about 5 mm. In embodiments, the ceramic matrix composite layer can have a thickness of about 0.1 mm to about 4 mm, or about 0.5 mm to about 3 mm, or about 0.1 mm to about 1 mm, or about 0.2 mm to about 1 mm, or about 0.5 mm to about 1 mm. For example, the ceramic matrix composite layer can have a thickness of about 0.1 mm, about 0.2 mm, about 0.3 mm, about 0.4 mm, about 0.5 mm, about 0.6 mm, about 0.7 mm, about 0.8 mm, about 0.9 mm, about 1 mm, about 1.5 mm, about 2 mm, about 3 mm, about 4 mm, or about 5 mm.

As used herein, the ceramic matrix composite layer can be fabricated using any suitable fabrication method known to one of ordinary skill in the art. For example, the ceramic matrix composite layer can be fabricated using a polymer infiltration and pyrolysis (PIP) method, a chemical vapor infiltration method, a liquid phase infiltration method, a hot press sintering method, or the like. In embodiments, the ceramic matrix composite layer can be fabricated by polymer infiltration and pyrolysis (PIP) or chemical vapor infiltration.

In embodiments, the ceramic matrix composite layer can be coated with a $H_2$ permeation barrier coating, a diffusion barrier layer, or both. In embodiments, the ceramic matrix composite layer can be provided outbound from one or more of the transition metal layer the $H_2$ permeation barrier coating, and the diffusion barrier layer. In embodiments, ceramic matrix composite layer can entirely surround one or more of the transition metal layer, the $H_2$ permeation barrier coating, and the diffusion barrier layer. In embodiments, the ceramic matrix composite layer can be provided radially outbound from the diffusion barrier layer and surrounds the diffusion barrier layer entirely. In embodiments, the ceramic matrix composite layer can be provided as the outer most shell layer.

It is advantageously provided herein that the ceramic matrix composite layer can provide high-temperature mechanical strength without introducing materials that result in an extraneous neutron penalty, and have low thermal neutron capturing cross-section. Also, advantageously, in embodiments, the ceramic matrix composite layer can be made of materials that have moderation performance (e.g., C/C, SiC/SiC, etc.).

Figure 12:
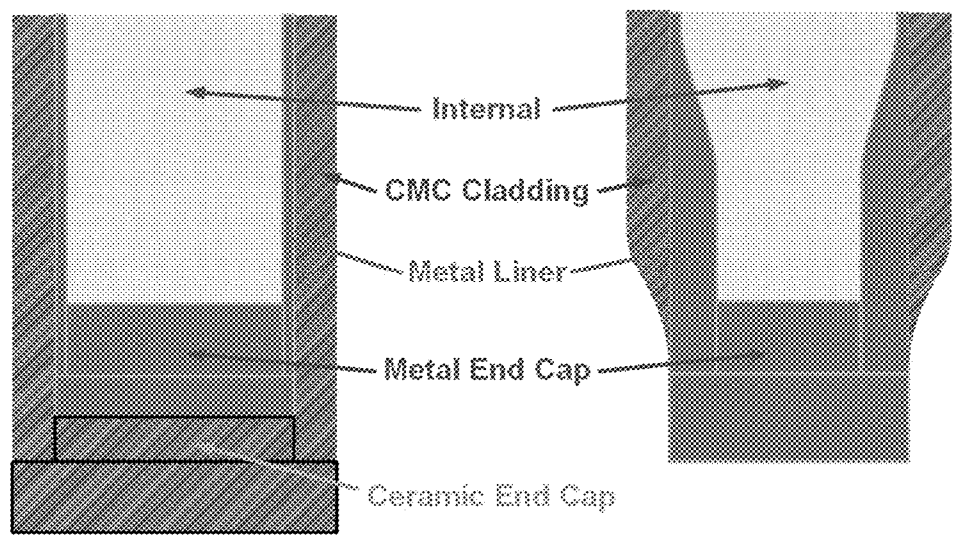
FIG. 12 is a schematic illustration two variations of a cylindrical moderation module having different end caps in accordance with embodiments.

The moderation module provided in the disclosure can be any shape that is suitable to one of ordinary skill in the art. In embodiments, the moderation module can be hexagonal, spherical, or cylindrical in shape. In embodiments, the moderation module can be cylindrical in shape. The cylindrical moderation module can have the metal hydride present as the cylindrical core. In embodiments, the transition metal layer is provided radially outbound from the cylindrical core and surrounds the cylindrical core entirely. In embodiments, an inner surface of the transition metal layer is coated with the $H_2$ permeation barrier. In embodiments, an outer surface of the transition metal layer is coated with the diffusion barrier. In embodiments, the ceramic matrix composite layer is provided radially outbound from the diffusion barrier and surrounds the diffusion barrier entirely. In an embodiment, the cylindrical moderation module can have the metal hydride present as the cylindrical core; the transition metal layer is provided radially outbound from the cylindrical core and surrounds the cylindrical core entirely; an inner surface of the transition metal layer is coated with the $H_2$ permeation barrier and the $H_2$ permeation barrier coats the inner surface of the transition metal layer entirely; an outer surface of the transition metal layer is coated with the diffusion barrier and the diffusion barrier coats the outer surface of the transition metal layer entirely; and, the ceramic matrix composite layer is provided radially outbound from the diffusion barrier and surrounds the diffusion barrier entirely. In embodiments, the moderation module can be provided as seen in FIG. 5. In embodiments, the metal layer can cap the end of the cylindrical core, as shown in the both illustrations of FIG. 12. In embodiments, the metal layer can be provided as a thick end cap and the ceramic matrix composite layer can be provided to taper its thickness near the end of the cylindrical core, as shown in FIG. 12 (right). In embodiments, the moderation module can include ceramic end caps on the cylindrical core, as shown in FIG. 12 (left).

Figure 11:
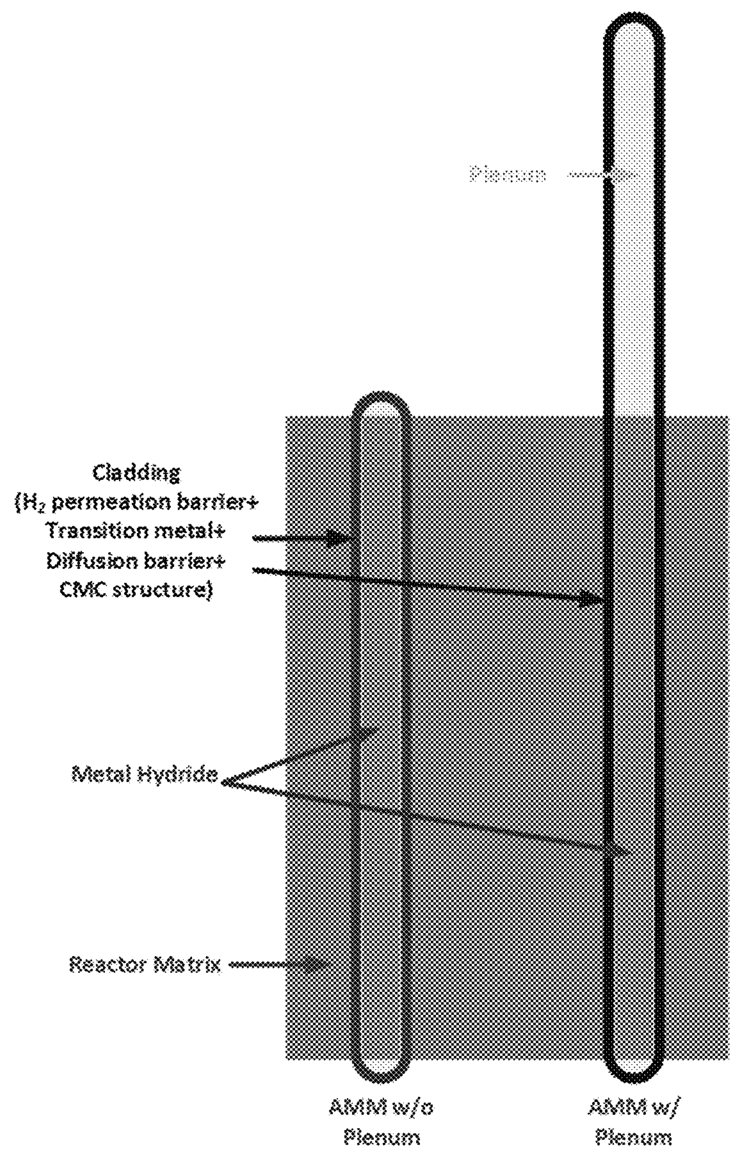
FIG. 11 is a schematic illustration of a moderation module with and without a plenum region in accordance with embodiments herein.

Referring to FIG. 11, in embodiments, the moderation module can further include a plenum region, wherein the plenum region is adjacent to the metal hydride core and the shell surrounding the core. It has been advantageously found that inclusion of such a plenum region as provided in the disclosure can allow the use of thermal dissociation as a negative reactivity feedback that will reduce core power or make it more sub-critical during high-temperature transient events, therefore providing an additional passive safety feature to the thermal reactor core design.

Figure 1A:
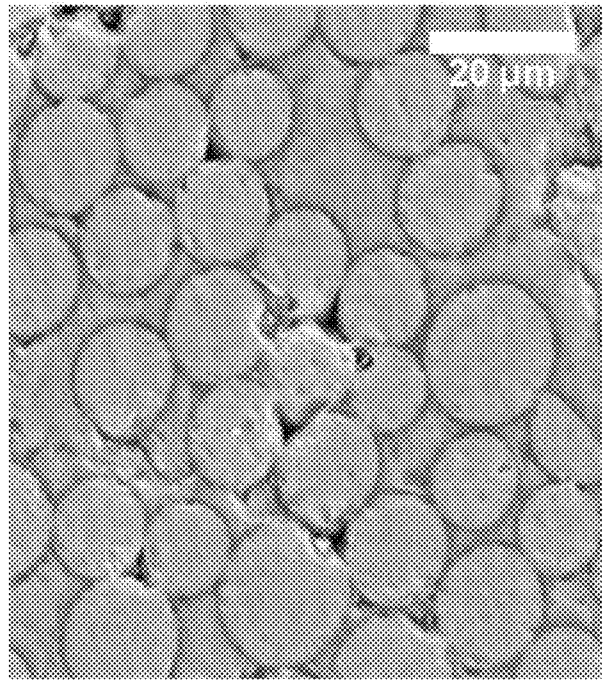
FIG. 1A is a scanning electron microscopy image of a ceramic matrix composite layer (CMC) in accordance with embodiments of the disclosure.
Figure 1B:
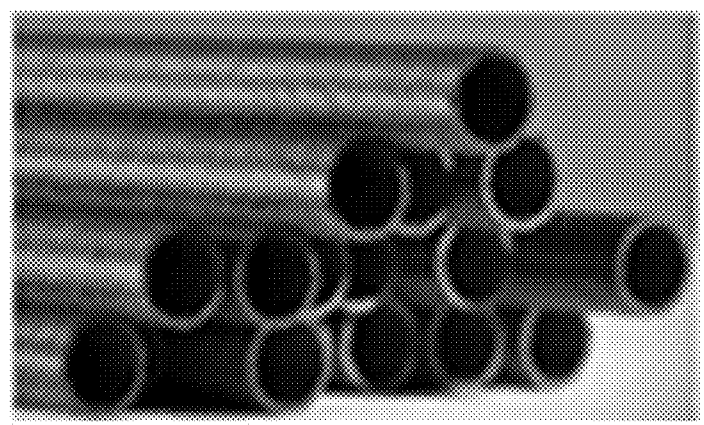
FIG. 1B is a photographic image of ceramic matrix composite layers (CMC) in accordance with embodiments of the disclosure.
Figure 1C:
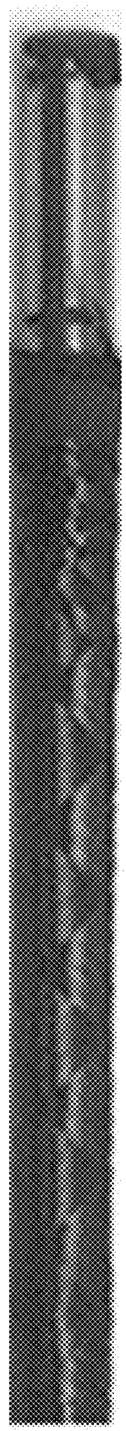
Figure 7:
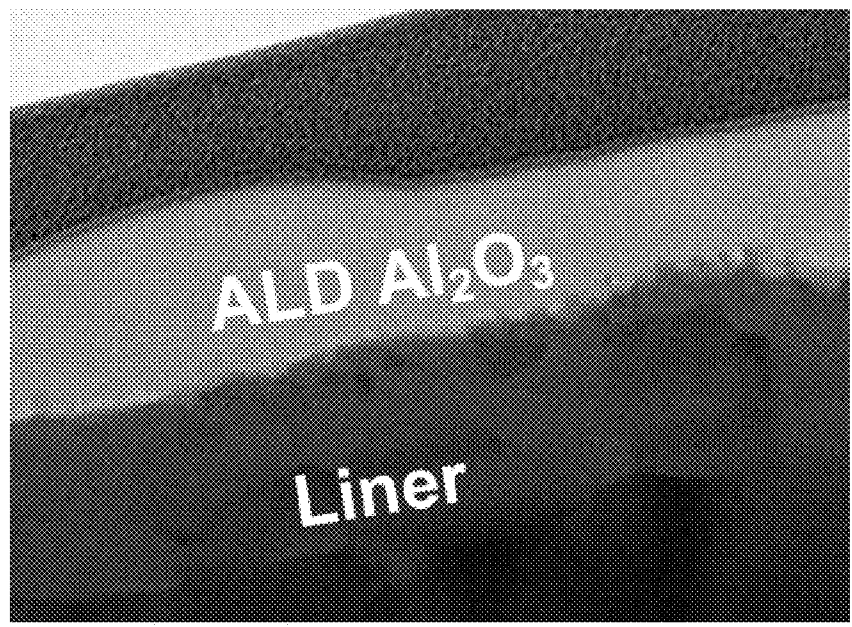
FIG. 7 is a transmission electron microscopy image of a pin-hole free monolithic ceramic diffusion barrier layer formed by atomic layer deposition (ALD) in accordance with embodiments of the disclosure.
Figure 9A:
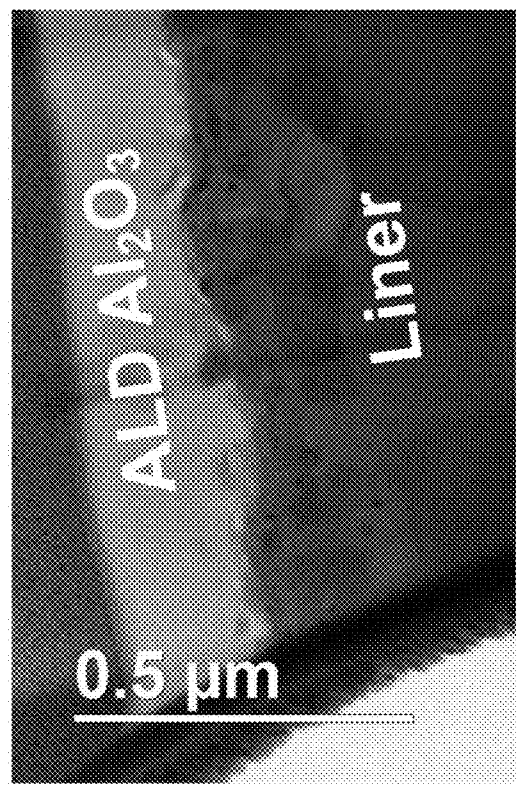
FIG. 9A is a transmission electron microscopy image of a pin-hole free monolithic $H_2$ permeation barrier coating made by atomic layer deposition (ALD) in accordance with embodiments of the disclosure.
Figure 9B:
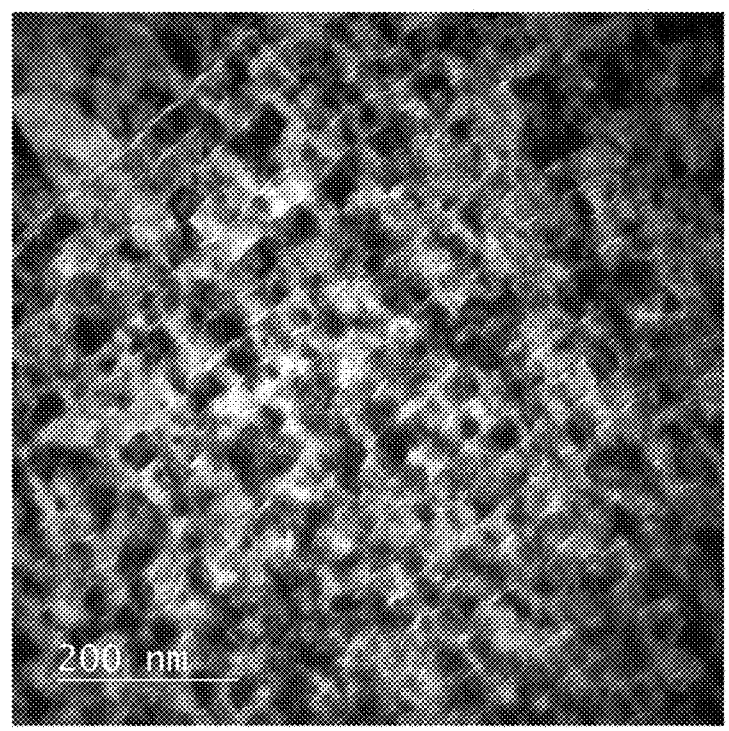
FIG. 9B is a transmission electron microscopy image of pin-hole free monolithic $H_2$ permeation barrier coating enabled by atomic layer deposition (ALD) in accordance with embodiments of the disclosure.
Figure 10:
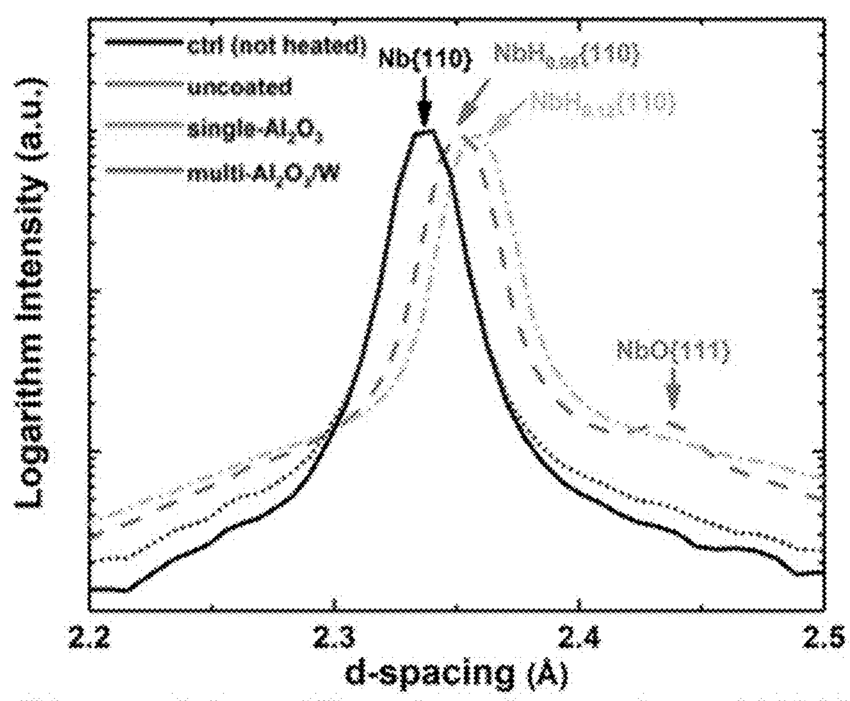
FIG. 10 is a photographic image of a transition metal layer braided by SiC fiber prior to SiC matrix infiltration.

Advantageously, the moderation module is provided to combine features such as, the metal hydride core, the $H_2$ permeation barrier coating and the transition metal liner. Added benefits can be obtained in various applications by further including a diffusion barrier layer and/or a ceramic matrix composite layer. The high-performance metal hydride/deuteride core (e.g., $YH_2$) can advantageously provide excellent hydrogen density at VHTR temperature to benefit neutronics (FIG. 2). The transition metal layer, such as a refractory metal liner (e.g. Nb or Mo), can advantageously provide a ductile and radiation tolerant substrate for advanced coatings, and can maintain its integrity under thermal shocks and high irradiation (FIG. 8). The $H_2$ permeation barrier coating can be advantageously provided as a pin-hole free monolithic $H_2$ permeation barrier coating (e.g., ceramic coatings). Moreover, the $H_2$ permeation barrier coating can be advantageously enabled by atomic layer deposition (ALD) to provide exceptional hydrogen barrier, and can be enhanced by nanoscale multilayer structure with metal layers for superior thermal shock resistance (FIGS. 9A and 9B). The ceramic matrix composite layer (CMC) (e.g. SiC/SiC, C/SiC, and C/C) can be advantageously provided to have high-temperature mechanical strength without introducing extraneous neutron penalty (FIGS. 1A, 1B, and 1C). The diffusion barrier layer can be advantageously provided as a pin-hole free monolithic ceramic diffusion barrier layer. The diffusion barrier layer can be enabled by atomic layer deposition (ALD) to provide exceptional diffusion barrier between the transition metal layer and the ceramic matrix composite layer, and can be enhanced by nanoscale multilayer structure with metal layers for superior thermal shock resistance (FIG. 7). Optionally, the moderation module can include a plenum region, that advantageously can be added to the hydride moderator enclosure as a buffer area allowing for reversible reduction of H/M ratio (i.e. hydrogen density or moderation efficiency) when the temperature is high (FIG. 11). This can work as an extra negative feedback mechanism of reactivity to enhance the safety of the reactor.

Thermal Neutron Reactor

Provided herein is a thermal neutron reactor. In accordance with embodiments, the thermal neutron reactor can include a composite matrix. The composite matrix provided in the disclosure can include the moderation module as provided in the disclosure, a fuel, a holding material, and a heat transfer module. In embodiments, the thermal neutron reactor can be a thermal neutron micro-reactor. In embodiments, the moderation module of the disclosure can further comprise a plenum region adjacent to the metal hydride core and the shell surrounding the core.

The thermal neutron reactor can be provided in any shape suitable to one of ordinary skill in the art. In embodiments, the thermal neutron reactor can be spherical, cylindrical, or prismatic. In embodiments, the thermal neutron reactor is prismatic (e.g. made of hexagonal assemblies). FIG. 5 shows a hexagonal assembly of such a prismatic thermal neutron reactor.

In embodiments, the holding material can be one or more of graphite, SiC, C, $Al_2O_3$, $Al_2O_3$—$SiO_2$, $Si_3N_4$, SiC/SiC, C/SiC, C/C, SiC/C, $Al_2O_3/Al_2O_3$, BeO, MgO, Zr, Mo, stainless steels, or combinations thereof. In embodiments, the holding material is graphite.

The fuel as provided in the disclosure can be any suitable fuel to one of ordinary skill in the art. In embodiments, the fuel can include tri-structural isotropic fuel particles (TRISO) FCO, TRISO FCN, $F_xN_y$, FZr, FM, $F_xO_y$, $F_xC_y$, wherein, F is U, UPu, UTh, ThPu, M is a metal, and, each x and y is in a range of about 1 to about 10.

The heat transfer modules as provided in the disclosure can be any suitable heat transfer module to one of ordinary skill in the art. In embodiments, the heat transfer modules can include coolant channels, heat-pipes, or a combination thereof. In embodiments, the heat transfer modules include coolant channels. In embodiments, the coolant channels include fluid coolant and the fluid coolant comprises He, $O_2$, $N_2$, $CO_2$, $H_2O$, $D_2O$, Ar, $H_2$, or combinations thereof. In embodiments, the heat transfer modules include heat-pipes. In embodiments, the heat-pipes can include working fluid and the working fluid comprises one or more of Na, K, Li, NaK, Hg, S, Cs, Ag, $H_2O$, Dowtherm A, naphthalene, phenol, toluene, aniline, and the like.

For example, FIG. 5 is a schematic illustration of a radial cut out of the assembly of a thermal neutron reactor in accordance with embodiments herein. The thermal neutron reactor of FIG. 5 includes multiple moderation modules in accordance with embodiments herein in a cylindrical shape as part of a graphite matrix, multiple coolant channels, and multiple fuel pins. FIG. 5 also shows a blow up schematic illustration of a single moderation module including the core and shell layers, wherein the core is shown as the hydride moderator, the $H_2$ permeation barrier coating (hydrogen barrier) is provided radially outbound from the core, the transition metal layer (metal liner) is provided radially outbound from the $H_2$ permeation barrier coating, the diffusion barrier layer (diffusion barrier) is provided radially outbound from the transition metal layer, the ceramic matrix composite layer (CMC cladding) is provided radially outbound from the diffusion barrier layer, and a joining layer (Hi-Conductive joining) is used as a buffer between the moderation module and the graphite matrix (reactor matrix) of the thermal neutron reactor.

EXAMPLES

In the examples below, characterization of the moderation module properties and methods of preparing the moderation module are disclosed.

Example 1—Atomic Layer Deposition of Multi-Layered Barrier Layers

The atomic layer deposition conditions for the deposition of a multi-layered $H_2$ barrier layer coating and/or a multi-layered diffusion barrier layer with an alumina ceramic layer and a tungsten (W) metal layer are shown in Table 1 below.

TABLE 1

| ALD deposited Coating Chemistry | Temperature (° C.) | Cycle | Chemical | Pulse (seconds) | Purge (seconds) |
|---|---|---|---|---|---|
| Alumina | 175 | 1 | TMA | 1 | 10 |
| ($Al_2O_3$) | | 2 | $H_2O$ | 0.5 | 10 |
| W | 175 | 1 | $WF_6$ | 1 | 15 |
| | | 2 | $Si_2H_6$ | 0.5 | 15 |

TMA = Trimethyl aluminum;
$WF_6$ = tungsten hexafluoride;
$Si_2H_6$ = Disilane

Example 2—Comparison of Very High Temperature Micro-Reactors with and without Moderation Modules The moderation module of the disclosure was applied to improve the performance of a Very High Temperature Micro-Reactor concept and the results demonstrating the benefits of the moderation module technology are shown in FIG. 3. In this numerical experiment, a rigorous multi-criteria optimization approach was applied to design nuclear cores using similar sets of input parameters and design constraints, with the objective to minimize the total weight of the core and maximize its core life-time, both competing performance targets enable facilitated core transportation and better economics features. The results in FIG. 3 show the pareto frontier of the optimization, with the performance of the best core candidates identified without the moderation module of this disclosure and the best core candidates identified with the moderation module of this disclosure. The moderation module enables designing VHTR-type micro reactors with reduced weight and/or with increased core life-time.

Design of the Moderation Module:

It was found that the moderation module design in accordance with the disclosure provided improved performance through the use of a high-performance metal hydride/deuteride core, a ductile and radiation tolerant transition metal layer, a pin-hole free monolithic $H_2$ permeation barrier coating, a pin-hole free monolithic diffusion barrier layer, a ceramic matrix composite layer that provides high-temperature mechanical strength, and optionally a plenum region to enhance the safety of the reactor.

Various moderation module (MM) concepts are compared in FIG. 4, which consist of $YH_2$ with various enclosure solutions. For the reference case without the MM k-infinity increases initially, peaks at ~10%, and decreases as packing fraction increases. This informs that the optimum moderator-to-fuel ratio is at the packing fraction of ~10%. However, for SMRs and micro-reactors, a low TRISO packing fraction (e.g., ~10%) limits power and operation time. Therefore, SMRs and micro-reactors are typically designed with TRISO packing fraction of 30-40%, or with plain fuel pins with even larger volume fraction, to make the core compact and commercially viable, which is far from the optimum moderator-to-fuel value. Thus, high-performance moderator that slows down neutrons more efficiently than graphite is needed to move the moderator-to-fuel ratio closer to the optimum value under high fuel fraction, and the MM in accordance with embodiments of the disclosure can meet this requirement. For the cases with MMs of the disclosure, k-infinity increases as packing fraction increases and becomes higher than the k-infinite without the MM. FIG. 4 shows an MM with SiC enclosures that enable the MM to reach the optimum of moderation with higher K-infinity at high packing fractions (>30%). However, since SiC by itself, would not be a proper barrier to hydrogen, an example of the moderation module of the disclosure using SiC with a transition metal layer (Nb) provides improved performance. The MM of the disclosure surpasses the neutronic performance obtained with enclosure solutions made of refractory metals using Niobium or Molybdenum alloys. Higher assembly k-infinity with large fuel fractions can be used to design denser and longer-life SMRs or micro-reactor cores. FIG. 2 is a graph showing $N_H$ as a function of temperature for high-performance metal hydride/deuteride cores in accordance with embodiments of the disclosure. FIG. 2 indicates that a $YH_2$ core would provide high-performance due to the excellent hydrogen density at VHTR temperature to benefit neutronics. FIG. 8 is a graph of various different transition metal layers comparing their reaction rate versus the inverse of temperature. FIG. 2 indicates refractory metals, such as Nb or Mo, provide a ductile and radiation tolerant substrate for advanced coatings, and can maintain its integrity under thermal shocks and high irradiation. FIG. 9A is a transmission electron microscopy image of an $Al_2O_3$ single layered pin-hole free monolithic $H_2$ permeation barrier coating enabled by atomic layer deposition (ALD). FIG. 9B is a transmission electron microscopy image of an $Al_2O_3/ZrO_2$ multi-layered pin-hole free monolithic $H_2$ permeation barrier coating enabled by atomic layer deposition (ALD). FIGS. 1E and 1F confirm the pin-hole free monolithic nature of the $H_2$ permeation barrier coating in accordance with embodiments herein contributing to their exceptional hydrogen barrier performance. The $H_2$ permeation barrier coatings can be enhanced by a nanoscale multilayer structure with metal layers for superior thermal shock resistance (FIG. 9A). FIG. 7 is a transmission electron microscopy image of an $Al_2O_3$ single layered pin-hole free monolithic diffusion barrier layer enabled by atomic layer deposition (ALD) in between a Nb transition metal layer and a SiC ceramic matrix composite layer. The diffusion barrier layer in accordance with embodiments herein can provide an exceptional diffusion barrier between the transition metal layer and the ceramic matrix composite layer, and can be enhanced by nanoscale multilayer structure with metal layers for superior thermal shock resistance. FIG. 1A is a scanning electron microscopy image of a cross-section of the SiC/SiC ceramic composite matrix layer in accordance with embodiments herein that provides high-temperature mechanical strength without introducing extraneous neutron penalty when combined with a transition metal layer (Nb) as shown in FIGS. 1B and 1C. Further, FIG. 11 is a schematic illustration of a cylindrical moderation module with a plenum region and without a plenum region. The plenum region can be added to the hydride moderator enclosure as a buffer area allowing for reversible reduction of H/M ratio (i.e. hydrogen density or moderation efficiency) when the temperature is high. This can work as an extra negative feedback mechanism of reactivity to enhance the safety of the reactor.

Table 2 below shows various comparative examples of previous designs to moderate reactors compared to the moderation modules in accordance with embodiments disclosed herein (GE Zr—Hydrides, Metal. "Mueller, W M, Blackledge, J P, and Libowitz, G G, Eds." *New York: Academic* (1968); GE Y—Olander, D., Ehud Greenspan, Hans D. Garkisch, and Bojan Petrovic. "Uranium-zirconium hydride fuel properties." *Nuclear Engineering and Design* 239, no. 8 (2009): 1406-1424; GA TRIGA—Simnad, M. T. *Nuclear Engineering and Design* 64, no. 3 (1981): 403-422; LANL—Shivprasad, Aditya Prahlad, Erik Paul Luther, Alexander Makenzie Long, Theresa Elizabeth Cutler, Travis Justin Grove, Vedant Kiritkumar Mehta, Michael William Donald Cooper et al. *High temperature moderator material for Microreactors*. No. LA-UR-20-21710. Los Alamos National Lab. (LANL), Los Alamos, N. Mex. (United States), 2020).

TABLE 2

| | GE Zr | GE Y | GA TRIGA | LANL | MM |
|---|---|---|---|---|---|
| Max Temp (° C.) | 650 | 900 (5K hr) | 750 | 950 | >1000 |
| Hydride | $ZrH_x$ | $YH_x$ | $ZrH_x$ | $YH_x$ | $YH_x$ |
| Foreign Materials (Hydride Dopants) | None | 5 wt % Cr | Li | None | None |

TABLE 2-continued

| | GE Zr | GE Y | GA TRIGA | LANL | MM |
|---|---|---|---|---|---|
| Hydrogen Density ($N_H$) | 4.1 | 5.0~5.3 | 5.6 | ~5.3 | ~5.3 |
| Structure Materials to enclose Hydride | None | FeCrAl + interlayer | SS | TZM | CMC + liner |
| Cladding Neutronics | None | FeCrAl + interlayer | SS | TZM | CMC + liner |
| $H_2$ Barrier | None | Intrinsic oxide layer | Intrinsic oxide layer | CVD ZrC | ALD multilayer |

The GE Zr module had a low max temperature, a low hydrogen density, does not include structure materials to enclose the hydride and does not have any hydrogen barrier layer. The GE Y module had a pretty high maximum temperature (900° C.), dopants were used in the hydride to improve the compatibility between the hydride and the enclosure, a high hydrogen density, and poor cladding neutronics performance. The GA TRIGA module had low maximum temperature (750° C.), dopants were used in the hydride, high hydrogen density, and poor cladding neutronics performance. The LANL module had poor cladding neutronics performance. The moderation modules of the disclosure herein provide operation at the highest maximum temperature of known modules, a high hydrogen density, improved cladding neutronics performance and excellent $H_2$ barrier.

The use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict embodiments for purposes of illustration only. One of ordinary skill in the art will readily recognize from the following discussion that alternative embodiments of the structures and methods illustrated herein may be employed without departing from the principles described herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A neutron moderation module comprising:

a metal hydride core; and a shell surrounding the core, the shell comprising:

at least one $H_2$ permeation barrier layer;

at least one transition metal layer;

at least one diffusion barrier layer; and at least one ceramic matrix composite layer, wherein:

the at least one $H_2$ permeation barrier layer is disposed between the at least one transition metal layer and the core, the at least one $H_2$ permeation barrier layer and the at least one diffusion barrier layer are separate separated by the at least one transition metal layer, and the at least one diffusion barrier layer is disposed between the at least one transition metal layer and the at least one ceramic matrix composite layer.

2. The moderation module of claim 1, wherein the metal hydride core comprises a compound represented by the formula $AR_x$, wherein A is one or more of Zr, Y, Ti, Li, Ca, Sc, or combinations thereof; each R is independently H or D; and x is in a range of 0.1 to 10.

3. The moderation module of claim 1, wherein the $H_2$ permeation barrier layer comprises one or more of $Al_2O_3$, $Y_2O_3$, $ZrO_2$, $TiO_2$, $SiO_2$, $Cr_2O_3$, ZrN, TiN, AlN, SiN, ZrC, TiC, SiC, NbC, TiAlC, ZrTiC, FeAl, $FeAl_2$, $Fe_2Al_5$, $ZrAl_3$, $MoSi_2$, $NbSi_2$, Si, ($ZrO_2$.$SiO_2$), and ($ZrO_2$.x$Y_2O_3$).

4. The moderation module of claim 1, wherein the diffusion barrier layer comprises one or more of $Al_2O_3$, $Y_2O_3$, $ZrO_2$, $TiO_2$, $SiO_2$, $Cr_2O_3$, ZrN, TiN, AlN, SiN, ZrC, TiC, SiC, NbC, TiAlC, ZrTiC, FeAl, $FeAl_2$, $Fe_2Al_5$, $ZrAl_3$, $MoSi_2$, $NbSi_2$, Si, ($ZrO_2$.$SiO_2$), and ($ZrO_2$.x$Y_2O_3$).

5. The moderation module of claim 1, wherein the $H_2$ permeation barrier layer comprises alternating ceramics layers and metal layers, wherein the ceramics layers comprise one or more of oxides, nitrides, carbides, aluminides, silicides, elemental ceramics, and complex oxides; and the metal layers comprise one or more of refractory metals, refractory metal alloys, metals capable of resisting a temperature of at least 600° C., alloys of metals capable of resisting a temperature of at least 600° C., and intermetallic compounds.

6. The moderation module of claim 5, wherein each metal layer and each ceramic layer, independently, have a thickness of about 5 nm to about 1000 nm.

7. The moderation module of claim 1, wherein the $H_2$ permeation barrier layer has a thickness of about 500 nm to about 10 μm.

8. The moderation module of claim 1, wherein the diffusion barrier layer has a thickness of about 500 nm to about 10 μm.

9. The moderation module of claim 1, wherein the $H_2$ permeation barrier layer is monolithic and pinhole free.

10. The moderation module of claim 1, wherein the transition metal layer comprises one or more of Ce, Yb, Mo, W, Nb, Ta, Ni, Co, and Fe, and alloys thereof.

11. The moderation module of claim 1, wherein the ceramic matrix composite layer comprises a reinforcement phase (A) and a matrix phase (B).

12. The moderation module of claim 1, wherein the ceramic matrix composite layer has a thickness of about 0.1 mm to about 5 mm.

13. The moderation module of claim 1, wherein an inner surface of the transition metal layer is coated with the $H_2$ permeation barrier layer.

14. The moderation module of claim 1, wherein the shell further comprises a ceramic matrix composite layer, and the ceramic matrix composite layer is provided radially outbound from the diffusion barrier layer and surrounds the diffusion barrier layer entirely.

15. The moderation module of claim 1, wherein the moderation module can withstand temperatures of greater than 600° C. without degradation.

16. A thermal neutron nuclear reactor comprising a composite matrix, wherein the composite matrix comprises the moderation module of claim 1, a fuel, a reactor matrix, and a heat transfer module.

17. A thermal neutron nuclear reactor comprising a composite matrix, wherein the composite matrix comprises the moderation module of claim 1, a fuel, and a fluid coolant or a heat transfer module.

18. A neutron moderation module, comprising:
- a metal hydride core; and
- a shell surrounding the core, the shell comprising:
  - at least one $H_2$ permeation barrier layer;
  - at least one transition metal layer; and
  - at least one diffusion barrier layer,
- wherein:
  - the at least one $H_2$ permeation barrier layer is disposed between the at least one transition metal layer and the core,
  - the at least one $H_2$ permeation barrier layer and the at least one diffusion barrier layer are separated by the at least one transition metal layer, and
  - the diffusion barrier layer comprises alternating ceramics layers and metal layers, wherein
    - the ceramics layers comprise one or more of oxides, nitrides, carbides, aluminides, silicides, elemental ceramics, and complex oxides; and
    - the metal layers comprise one or more of refractory metals, refractory metal alloys, metals capable of resisting a temperature of at least 600° C., alloys of metals capable of resisting a temperature of at least 600° C., and intermetallic compounds.

19. A neutron moderation module comprising:
- a metal hydride core; and
- a shell surrounding the core, the shell comprising:
  - at least one $H_2$ permeation barrier layer;
  - at least one transition metal layer; and
  - at least one diffusion barrier layer,
- wherein:
  - the diffusion barrier layer is a pinhole free monolithic diffusion barrier layer,
  - the at least one $H_2$ permeation barrier layer is disposed between the at least one transition metal layer and the core, and
  - the at least one $H_2$ permeation barrier layer and the at least one diffusion barrier layer are separated by the at least one transition metal layer.

* * * * *